US012801725B2

(12) United States Patent
Seck et al.

(10) Patent No.: US 12,801,725 B2
(45) Date of Patent: Nov. 17, 2026

(54) SYSTEMS AND METHODS FOR DETECTING VULNERABILITIES IN SOFTWARE IN REAL TIME

(71) Applicant: Capital One Services, LLC, McLean, VA (US)

(72) Inventors: Mohamed Seck, Aubrey, TX (US); Ebrima N. Ceesay, Vienna, VA (US); Krystan R. Franzen, Mechanicsville, VA (US)

(73) Assignee: Capital One Services, LLC, McLean, VA (US)

( * ) Notice: Subject to any disclaimer, the term of this patent is extended or adjusted under 35 U.S.C. 154(b) by 183 days.

(21) Appl. No.: 18/506,964

(22) Filed: Nov. 10, 2023

(65) Prior Publication Data

US 2025/0156531 A1 May 15, 2025

(51) Int. Cl.

*G06F 21/54* (2013.01)
*G06F 21/56* (2013.01)
*G06F 21/57* (2013.01)

(52) U.S. Cl.

CPC ............ *G06F 21/54* (2013.01); *G06F 21/563* (2013.01); *G06F 21/577* (2013.01); *G06F 2221/033* (2013.01)

(58) Field of Classification Search

USPC ........................................................... 726/22
See application file for complete search history.

(56) References Cited

U.S. PATENT DOCUMENTS 10,296,745 B2 * 5/2019 Baset ........................ G06F 9/542
2005/0108562 A1 * 5/2005 Khazan ............... G06F 11/3604 726/23
2015/0033342 A1 * 1/2015 Zhang ................... G06F 21/563 726/23
2019/0079734 A1 * 3/2019 Kadam ................. G06F 21/577
2019/0324744 A1 * 10/2019 Alam ......................... G06F 8/31
2022/0108020 A1 * 4/2022 Dang ....................... G06F 8/658
2022/0222353 A1 * 7/2022 Nagaraja ................... G06F 8/71
2023/0333835 A1 * 10/2023 Castrejon, III ........... G06F 8/71

(Continued)

FOREIGN PATENT DOCUMENTS

CN 117521072 A * 2/2024 ........... G06F 21/577

*Primary Examiner* — Eleni A Shiferaw
*Assistant Examiner* — Duilio Munguia
(74) *Attorney, Agent, or Firm* — Foley & Lardner LLP

(57) ABSTRACT

Systems and methods for detecting vulnerabilities in software in real time. In some aspects, the system receives a training dataset, including first source code, first runtime data flow, a set of sample vulnerable libraries, and a set of sample replacement software libraries. Using the training dataset, the system trains a vulnerability detection model. The system receives second source code being tested in a development environment and collects the second source code and second runtime data flow. The system processes the second source code and second runtime data flow using the vulnerability detection model to identify novel vulnerable software libraries and/or known vulnerable software libraries. The system generates suggestions to replace the known and/or novel vulnerable software libraries. In response to detecting a user choosing a first replacement library in place of a first vulnerable library, the system replaces the first vulnerable library with the first replacement library.

20 Claims, 4 Drawing Sheets

400

(56) References Cited

U.S. PATENT DOCUMENTS

| | | | | |
|---|---|---|---|---|
| 2024/0184892 | A1* | 6/2024 | Ganz | G06F 21/563 |
| 2024/0241963 | A1* | 7/2024 | Wareus | G06F 21/577 |
| 2025/0077204 | A1* | 3/2025 | Guttridge | G06F 8/4435 |
| 2025/0139251 | A1* | 5/2025 | Sumedrea | G06F 21/563 |

* cited by examiner

400

SYSTEMS AND METHODS FOR DETECTING VULNERABILITIES IN SOFTWARE IN REAL TIME

SUMMARY

Methods and systems are described herein for novel uses and/or improvements to artificial intelligence applications. As one example, methods and systems are described herein for using a development environment add-on to parse source code and its runtime dataflow and identify vulnerable libraries.

Conventional systems have not contemplated processing source code as well as its runtime data flow in real time to identify vulnerable software libraries on a case-by-case basis. In particular, existing systems cannot identify novel vulnerable software libraries upon first encounter. To overcome these technical deficiencies in adapting artificial intelligence models for this practical benefit, methods and systems disclosed herein train a vulnerability detection model on data including source code, runtime data flows, and sample vulnerable libraries to identify vulnerabilities de novo on input data. The vulnerability detection model uses machine learning to give consideration to the full context of input source code, and may therefore identify vulnerable software libraries more accurately, including novel vulnerabilities not in its training data. Based on the output of the vulnerability detection model, the system may suggest replacement software libraries for known vulnerable libraries. Additionally, user actions in response to suggested replacements may be recorded for monitoring to ensure code safety.

In some aspects, methods and systems are described herein comprising: receiving a training dataset, comprising first source code, first runtime data flow, and a first set of sample vulnerable libraries associated with the first source code; using the training dataset, training a vulnerability detection model to detect vulnerable software libraries in the first source code; receiving second source code being tested in a development environment; collecting, through the development environment, the second source code and second runtime data flow associated with the second source code; processing the second source code and second runtime data flow using the vulnerability detection model to identify a set of novel vulnerable software libraries and a set of known vulnerable software libraries in the second source code, wherein the set of novel vulnerable software libraries is not in the first set of sample vulnerable libraries, and wherein the set of known vulnerable software libraries is in the first set of sample vulnerable libraries and used in training the vulnerability detection model; generating a set of replacement libraries to replace the set of known vulnerable software libraries and the set of novel vulnerable software libraries; and for each vulnerable library in the set of novel vulnerable software libraries and the set of known vulnerable software libraries, in response to detecting a replacement library in the set of replacement libraries, replacing the vulnerable library with an associated replacement library.

Various other aspects, features, and advantages of the systems and methods described herein will be apparent through the detailed description and the drawings attached hereto. It is also to be understood that both the foregoing general description and the following detailed description are examples and are not restrictive of the scope of the systems and methods described herein. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments described herein. It will be appreciated, however, by those having skill in the art that the embodiments may be practiced without these specific details or with an equivalent arrangement. In other cases, well-known structures and devices are shown in block diagram form in order to avoid unnecessarily obscuring the embodiments.

Figure 1:
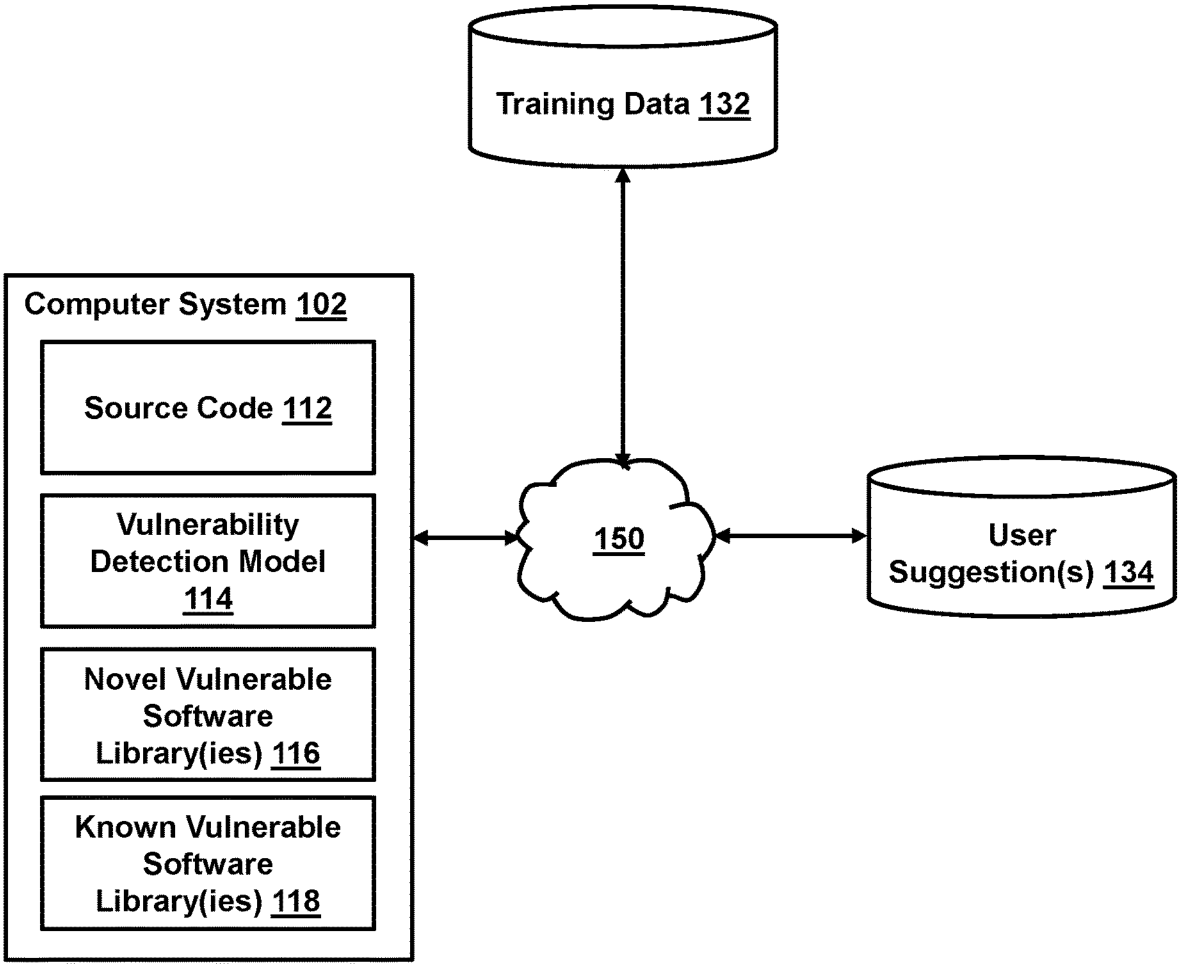
FIG. 1 shows an illustrative diagram for a system for detecting vulnerabilities in software in real time, in accordance with one or more embodiments.

FIG. 1 shows an illustrative diagram for system 150, which contains hardware and software components used to train resource consumption machine learning models, extract explainability vectors and perform feature engineering, in accordance with one or more embodiments. For example, Computer System 102, a part of System 150, may include Source Code 112, Vulnerability Detection Model 114, Novel Vulnerable Software Library(ies) 116, and Known Vulnerable Software Library(ies) 118. The system may additionally retrieve, store, and use Training Data 132 and User Suggestion(s) 134.

System 150 (the system) may receive Training Data 132 from a database or training system. Training Data may include source code and associated runtime data flow. For example, the source code may be programs written in one or more programming languages, including functions that cause various computations when executed. The source code may use one or more software libraries, which are resources and functionalities used in software development including configuration data, documentation, help data, message templates, pre-written code and subroutines, classes, values or type specifications. The source code may import or load software libraries for use in one or more functions. The source code may be collected from one or more development environments during the development of projects. Training Data 132 may include runtime data flow corresponding to pieces of source code. The runtime data flow may include program states, control flow data, traces of source code in execution, functional requirements of the source code, and assembly or binary compilations of the source code. Runtime data flows capture the transformation and passage of data caused by the source code.

Training Data 132 may be labeled with a set of sample vulnerable libraries. In some embodiments, the system may provide a registry of known vulnerabilities within a set of vulnerable libraries. Any source code using one or more of the vulnerable libraries may thus be labeled as vulnerable. In other embodiments, the system may label the application of certain libraries to certain situations as vulnerable. For example, a random number generator from a first library used in conjunction with a dataset from a second library may constitute a vulnerability. The system may detect occurrences of such applications of libraries in the source code of Training Data 132 and label the occurrences as vulnerable. In some embodiments, the system may label each vulnerability with a category and extent of vulnerability. The extent, also referred to as a vulnerability estimate, may be a numerical indication of the severity of harm made possible by the vulnerability. The category may indicate the nature of the vulnerability, for example, a security breach, an unintended disclosure of sensitive information, or the possibility of perpetuating errors.

Training Data 132 may also include a set of sample replacement libraries. For example, the system may use Training Data 132 to train a machine learning model that outputs replacement suggestions for a vulnerable software library. The sample replacement libraries may correspond to one or more vulnerable libraries in the set of sample vulnerable libraries. The replacement identification machine learning model may be trained to correlate an input vulnerable library to one or more replacement libraries in the set of sample replacement libraries, for example using a clustering algorithm. In some embodiments, the replacement identification machine learning model may be part of Vulnerability Detection Model 114.

Training Data 132 may be formatted as a first set of features, which may be used as input by a machine learning model (e.g., Vulnerability Detection Model 114). The first set of features may contain categorical or quantitative variables, and values for such features may include the source code and the runtime data flow in one or more formats. For example, the source code may be formatted as text tokens. Each text token may, for example, be a word or a punctuation mark. Alternatively, text tokens may correspond to the contents of lines of code, or functions within source code. Text tokens may contain text in plain alphanumerical form and may not be embedded to real values. Runtime data flow may be represented in a quantitative format. For example, the program states and control flow data may be represented as collections of real numbers in a data structure. Each entry in Training Data 132 may be labeled with vulnerabilities where applicable. Additionally, the system may label Training Data 132 with a set of outcomes associated with the source code. The set of outcomes indicates results from executing the source code, for example, system crashes, incorrect computations, and other consequences.

In some embodiments, the system may process Training Data 132 using a data cleansing process to generate a processed dataset. The data cleansing process may include removing outliers, standardizing data types, formatting and units of measurement, and removing duplicate data.

The system may train a first machine learning model (e.g., Vulnerability Detection Model 114) based on Training Data 132. Vulnerability Detection Model 114 may take as input a vector of feature values for source code and runtime data flow in the same format as Training Data 132. Vulnerability Detection Model 114 may use one or more algorithms like linear regression, generalized additive models, artificial neural networks or random forests to generate an output symbolizing vulnerabilities in the input source code. The system may partition Training Data 132 into a training set and a cross-validating set. Using the training set, the system may train Vulnerability Detection Model 114 using, for example, the gradient descent technique. The system may then cross-validate the trained model using the cross-validating set and further fine-tune the parameters of the model. Vulnerability Detection Model 114 may include one or more parameters that it uses to translate input into outputs. For example, an artificial neural network contains a matrix of weights, each weight in which is a real number. The repeated multiplication and combination of weights transform input values to Vulnerability Detection Model 114 into output values. The system may measure the performance of Vulnerability Detection Model 114 using a method such as cross-validation to generate a quantitative representation, e.g., a first performance metric.

Vulnerability Detection Model 114 may, in some embodiments, output a set of vulnerable software libraries labeled with vulnerability estimates corresponding to each vulnerable software library. The vulnerability estimates indicate an expected severity or likelihood of harm arising from the vulnerable software library. In some embodiments using associated vulnerability estimates or degrees of severity the system may determine that a first subset of vulnerable software libraries exceed a threshold severity. The system may thus transmit a notification to a deployment system indicating that the first subset of vulnerable software libraries is ineligible for deployment. For example, the system may determine that a piece of source code is liable to cause a system crash if deployed due to one or more vulnerable libraries used. The system may therefore indicate to a development pipeline control system that the source code cannot be deployed for some period of time or until it is modified. In some embodiments, Vulnerability Detection Model 114 may output vulnerable software libraries in context due to specific applications that render the software libraries vulnerable. In other embodiments, Vulnerability Detection Model 114 may output general vulnerable software libraries which pose vulnerabilities by their nature.

The system may deploy the trained Vulnerability Detection Model 114 to a development environment. The development environment may collect a piece of second source code and a corresponding second runtime data flow. The second source code may not be included in Training Data 132. Vulnerability Detection Model 114 may take the second source code and the second runtime data flow as input. Vulnerability Detection Model 114 may produce an output of vulnerable software libraries, including a set of novel vulnerable software libraries (e.g., Novel Vulnerable Software Library(ies) 116) and a set of known vulnerable software libraries (e.g., Known Vulnerable Software Library(ies) 118) in the second source code. The novel vulnerable software libraries may be absent from Training Data 132 and have never been exposed to Vulnerability Detection Model 114. For example, a new vulnerability may be created by the combination of a first function from a first library with a separate function in the input source code. Neither the first function nor the first library has previously been identified as vulnerable, but this particular combination creates a vulnerability. By processing the runtime data flow in addition to the source code, Vulnerability Detection Model 114 may be able to determine software libraries to be vulnerable de novo. Among the vulnerable software libraries detected by Vulnerability Detection Model 114 may be known vulnerable software libraries. These libraries may have been in Training Data 132. The contextual applications of their vulnerability may be represented in Training Data 132, or the known vulnerable software libraries may have been labeled as generally vulnerable. In some embodiments, the known vulnerable software libraries are associated with a first set of sample replacement libraries in Training Data 132. In some embodiments, the system may receive a first set of compliance requirements. Compliance requirements related to permissible software libraries for the input source code. The system may therefore adjust the set of known vulnerable software libraries to include software libraries that contradict the first set of compliance requirements. For example, a particular software library may be in violation of a data integrity requirement imposed by the software developer's organization. The system may therefore choose to output the software library as vulnerable.

The system may present a set of suggestions to a user through the development environment, each suggestion in which corresponds to a known vulnerable software library. The system may generate the set of suggestions using a set of safe libraries. The system may use a similarity machine learning model to determine a set of replacement libraries associated with the set of known vulnerable software libraries. The similarity machine learning model may be trained to identify software libraries that are commonly used as replacements for each other. The training data for the similarity machine learning model may include past user suggestions for source code processed by the Vulnerability Detection Model 114 and/or datasets of software library occurrence frequencies in source code. The similarity machine learning model may output one or more replacement software libraries corresponding to each known vulnerable software library.

In some embodiments, the system may display replacements for each library in the set of known vulnerable software libraries in the development environment. For example, a user may click or hover their cursor over a citation to a known vulnerable library. The system may display one or more replacement libraries ranked by order of similarity, as determined by the output of the similarity machine learning model. For example, the system may display the replacement libraries grouped by category of harm as determined by Vulnerability Detection Model 114. Alternatively, the system may group the replacement libraries by severity of harm as determined by Vulnerability Detection Model 114.

The system may determine replacement libraries for each vulnerable software library in Known Vulnerable Software Library(ies) 118. For example, Vulnerability Detection Model 114 may be trained by Training Data 132 to identify a set of replacements for each vulnerable library in Known Vulnerable Software Library(ies) 118. For example, Vulnerability Detection Model 114 may rank the suggested replacements for each vulnerable library based on the context of the vulnerable library within the second source code.

The system may present Novel Vulnerable Software Library(ies) 116 through the development environment to a user responsible for generating the input source code. The system may request user input (e.g., as part of User Suggestion(s) 134) regarding the user's assessments of vulnerability or risk relating to Novel Vulnerable Software Library(ies) 116. For example, the system may ask the user to enter a numerical value for each vulnerable software library in Novel Vulnerable Software Library(ies) 116 indicating a likelihood or severity of harm resulting from the vulnerable library. The user may, for example, enter a real number or decline in order to indicate that the presented library is not in fact vulnerable. In some embodiments, the system may additionally request input from the user regarding common replacement libraries for the shown vulnerable library. The system may store the user's input in User Suggestion(s) 134. In some embodiments, User Suggestion(s) 134 may be formatted into training data, including source code, runtime data flow, and vulnerability estimates based on the user's input. The training data can then be used to update Vulnerability Detection Model 114.

In some embodiments, the system may generate confidence scores associated with Novel Vulnerable Software Library(ies) 116. Each confidence score may indicate a probability of a vulnerable software library in Novel Vulnerable Software Library(ies) 116 being a security concern. Due to not having been exposed to the novel vulnerable software libraries through Training Data 132, Vulnerability Detection Model 114 may be uncertain regarding the nature and extent of the threat posed by the libraries in Novel Vulnerable Software Library(ies) 116. As mentioned above, the system may therefore request user input. The system may additionally or alternatively display confidence scores to inform the user on estimated consequences of libraries in Novel Vulnerable Software Library(ies) 116. In some embodiments, the user may provide input in response to the system displaying a prompt in the software development environment, the input including the user's suggestions for replacement libraries for libraries in Novel Vulnerable Software Library(ies) 116. The system may record the suggestions for replacement in association with Novel Vulnerable Software Library(ies) 116 and use the suggestions for Training Data 132.

In some embodiments, the system may determine similarities of libraries in Novel Vulnerable Software Library (ies) 116 to one or more libraries in Known Vulnerable Software Library(ies) 118. The system may generate similarity scores (e.g., using the similarity machine learning model) for each library in Novel Vulnerable Software Library(ies) 116, a similarity score indicating a probability that the novel vulnerable library may share one or more replacements with a known vulnerable software library. In response to a similarity score exceeding a preset threshold, the system may display suggestions for the associated novel vulnerable software library in the development environment. The displayed suggestions may be those determined by Vulnerability Detection Model 114 or the similarity machine learning model for replacement of a corresponding known vulnerable software library in Known Vulnerable Software Library(ies) 118. The system may display the similarity score as a confidence score, for example, and record user input indicating whether the suggested replacement libraries are appropriate for the novel vulnerable software library.

In some embodiments, the user may select replacement libraries for the set of novel vulnerable software libraries and/or the set of known vulnerable software libraries. The system may detect and record user selections regarding replacement libraries. For example, the user selections may be transmitted to a development process review system, where additional oversight may be applied to the user's choices to ensure optimal development standards. For example, the user selections may be used as additional training data that, when used to label the set of known vulnerable software libraries, may be used to train Vulnerability Detection Model 114.

Figure 2:
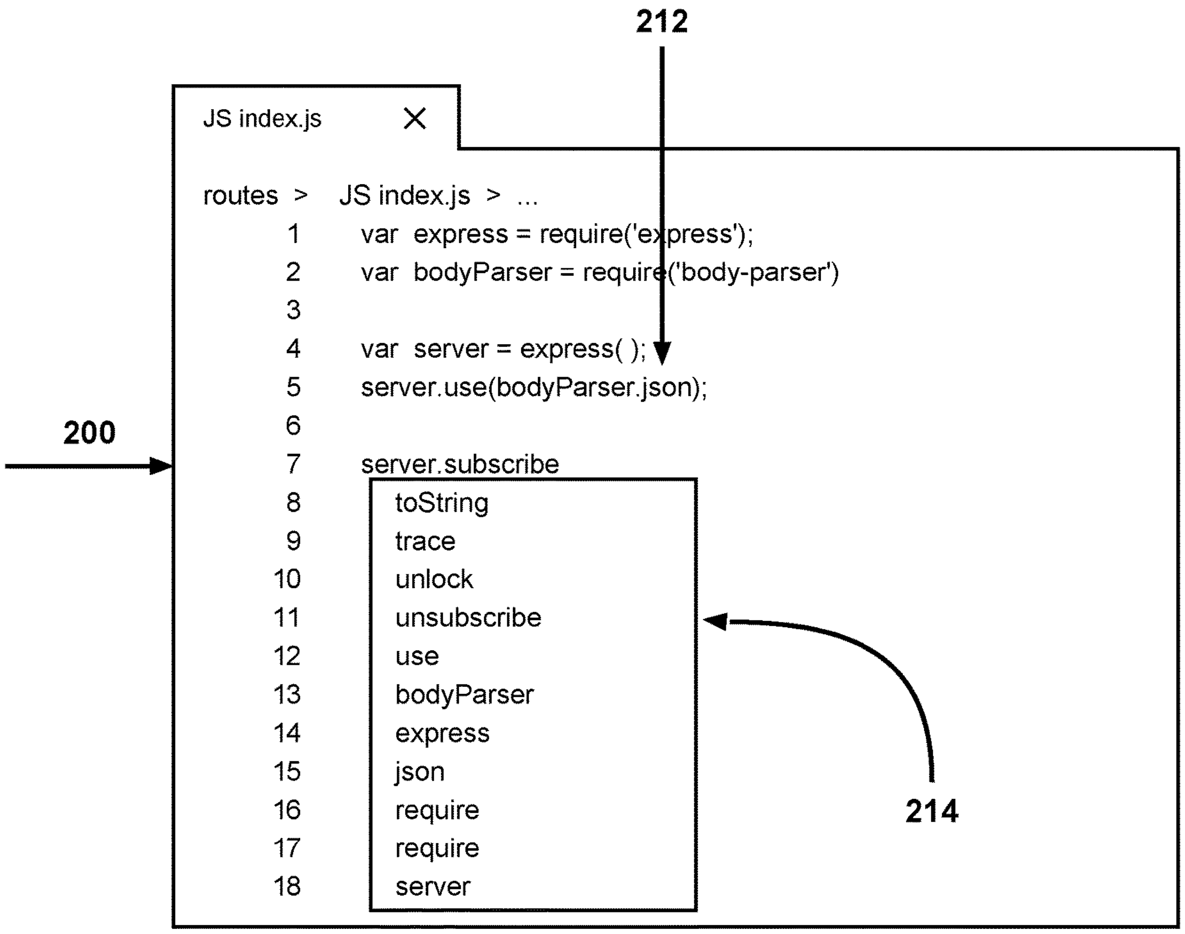
FIG. 2 shows an illustration of a development environment displaying source code, software libraries and suggested replacements, in accordance with one or more embodiments.

FIG. 2 shows development environment 200, which displays source code using various software libraries. For example, Library 212 is a software library used by a variable, "server", in the source code. The source code is presented in development environment 200 as plain text, consisting of alphanumeric strings, phrases and punctuation. The source code may be interpreted or compiled by the development environment to binary code, and may be executable using a build tool. Upon execution, the source code causes a runtime data flow, which involves retrieving, storing, and processing various information according to the specifications of the source code. The development environment may collect the runtime data flow and send it with the source code to the system for processing. The development environment may transmit the source code and the runtime data flow to Vulnerability Detection Model 114, which may output a set of vulnerable software libraries. The sections of the source code corresponding to the set of vulnerable software libraries may be highlighted in the development environment. The set of vulnerable software libraries may contain known vulnerable libraries and/or novel vulnerable libraries. The development environment may display one or more replacement libraries for each vulnerable library. For example, FIG. 2 shows Replacement Set 214 in conjunction with an instance of usage for a software library determined to be vulnerable by Vulnerability Detection Model 114. Replacement Set 214 may include functions or libraries meant as replacements for the library usage. Replacement Set 214 may be sorted by similarity to the vulnerable software library. In some embodiments, the replacement set may contain functions from the same library or a different library intended to cover the same role as the usage of the vulnerable software library. A user of the development environment may be able to interact with Replacement Set 214, for example clicking a replacement option to select an alternative for the vulnerable software library. In some embodiments, the development environment may display information regarding one or more options in Replacement Set 214, for example an explanation to why the replacement library is more secure. In some embodiments, the development environment may collect data regarding user selections within Replacement Set 214. The user selection data may be used as training data for Vulnerability Detection Model 114 or the similarity machine learning model used to generate Replacement Set 214. The user selection data may also be used to perform monitoring to safeguard the source code for deployment.

In some embodiments, the development environment may identify to the user a set of novel vulnerable software libraries based on output from Vulnerability Detection Model 114. For example, Library 212 may be identified as vulnerable. The development environment may highlight Library 212 and the user may be able to provide input such as replacement libraries. The user may also provide output regarding whether Library 212 should even be considered vulnerable. Again, the user selection data may be used as training data for Vulnerability Detection Model 114 or be used to perform monitoring to safeguard the source code for deployment.

Figure 3:
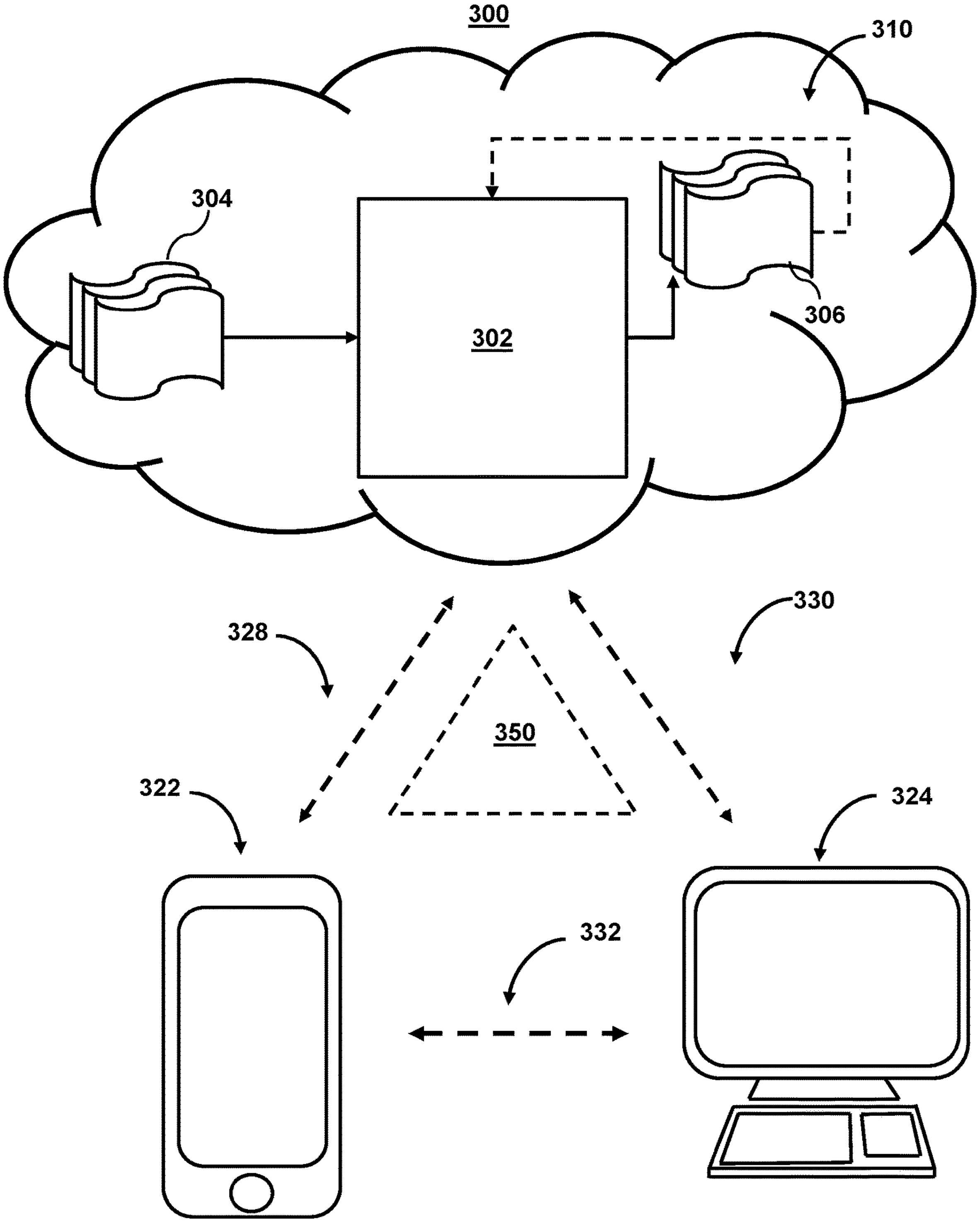
FIG. 3 shows illustrative components for a system for detecting vulnerabilities in software in real time, in accordance with one or more embodiments.

FIG. 3 shows illustrative components for a system used to communicate between the system and user devices and collect data, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., predicting resource allocation values for user systems).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., predicting resource allocation values for user systems).

In some embodiments, the model (e.g., model 302) may automatically perform actions based on outputs 306. In some embodiments, the model (e.g., model 302) may not perform any actions. The output of the model (e.g., model 302) may be used to predict resource allocation values for user systems).

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC. Thrift, etc.

In some embodiments, the system architecture may use an open API approach. In such cases, API layer 350 may use commercial or open-source API Platforms and their modules. API layer 350 may use a developer portal. API layer 350 may use strong security constraints applying WAF and DDOS protection, and API layer 350 may use RESTful APIs as standard for external integration.

Figure 4:
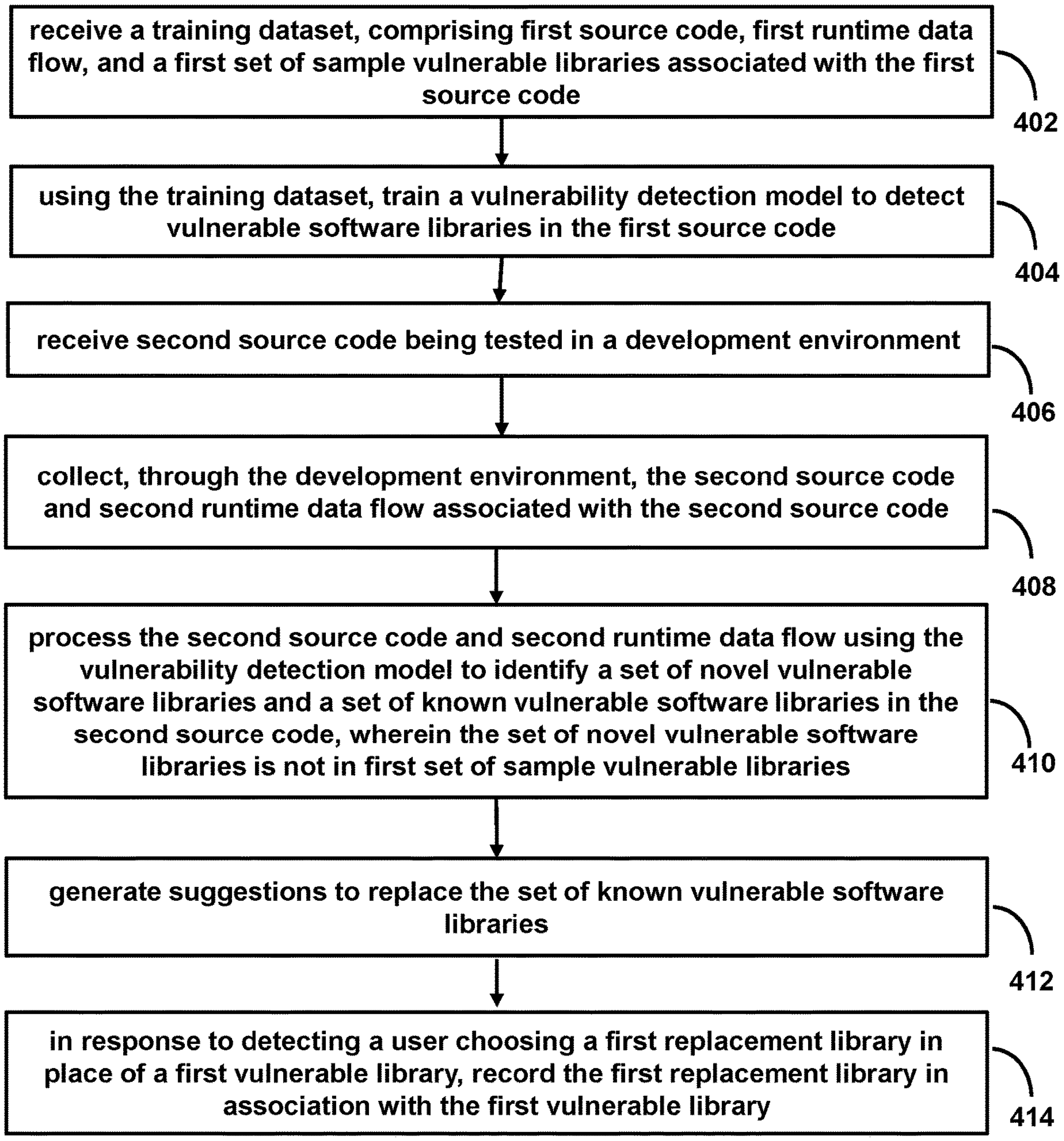
FIG. 4 shows a flowchart of the steps involved in detecting vulnerabilities in software in real time, in accordance with one or more embodiments.

FIG. 4 shows a flowchart of the steps involved in detecting vulnerabilities in software in real time, in accordance with one or more embodiments. For example, the system may use process 400 (e.g., as implemented on one or more system components described above) in order to train a vulnerability detection model, process source code and runtime data flow using the model, and identify novel and known vulnerable software libraries.

At step 402, process 400 (e.g., using one or more components described above) may receive a training dataset, including first source code, first runtime data flow, and a first set of sample vulnerable libraries associated with the first source code. System 150 (the system) may receive Training Data 132 from a database or training system. Training Data may include source code and associated runtime data flow. For example, the source code may be programs written in one or more programming languages, including functions that cause various computations when executed. The source code may use one or more software libraries, which are resources and functionalities used in software development including configuration data, documentation, help data, message templates, pre-written code and subroutines, classes, values or type specifications. The source code may import or load software libraries for use in one or more functions. The source code may be collected from one or more development environments during the development of projects. Training Data 132 may include runtime data flow corresponding to pieces of source code. The runtime data flow may include program states, control flow data, traces of source code in execution, functional requirements of the source code, and assembly or binary compilations of the source code. Runtime data flows capture the transformation and passage of data caused by the source code.

Training Data 132 may be labeled with a set of sample vulnerable libraries. In some embodiments, the system may provide a registry of known vulnerabilities within a set of vulnerable libraries. Any source code using one or more of the vulnerable libraries may thus be labeled as vulnerable. In other embodiments, the system may label the application of certain libraries to certain situations as vulnerable. For example, a random number generator from a first library used in conjunction with a dataset from a second library may constitute a vulnerability. The system may detect occurrences of such applications of libraries in the source code of Training Data 132 and label the occurrences as vulnerable. In some embodiments, the system may label each vulnerability with a category and extent of vulnerability. The extent, also referred to as a vulnerability estimate, may be a numerical indication of the severity of harm made possible by the vulnerability. The category may indicate the nature of the vulnerability, for example, a security breach, an unintended disclosure of sensitive information, or the possibility of perpetuating errors.

Training Data 132 may be formatted as a first set of features, which may be used as input by a machine learning model (e.g., Vulnerability Detection Model 114). The first set of features may contain categorical or quantitative variables, and values for such features may include the source code and the runtime data flow in one or more formats. For example, the source code may be formatted as text tokens. Each text token may, for example, be a word or a punctuation mark. Alternatively, text tokens may correspond to the contents of lines of code, or functions within source code. Text tokens may contain text in plain alphanumerical form and may not be embedded to real values. Runtime data flow may be represented in a quantitative format. For example, the program states and control flow data may be represented as collections of real numbers in a data structure. Each entry in Training Data 132 may be labeled with vulnerabilities where applicable. Additionally, the system may label Training Data 132 with a set of outcomes associated with the source code. The set of outcomes indicate results from executing the source code, for example system crashes, incorrect computations, and other consequences.

In some embodiments, the system may process Training Data 132 using a data cleansing process to generate a processed dataset. The data cleansing process may include removing outliers, standardizing data types, formatting and units of measurement, and removing duplicate data.

At step 404, process 400 (e.g., using one or more components described above) may, using the training dataset, train a vulnerability detection model to detect vulnerable software libraries in the first source code. The system may train a first machine learning model (e.g., Vulnerability Detection Model 114) based on Training Data 132. Vulnerability Detection Model 114 may take as input a vector of feature values for source code and runtime data flow in the same format as Training Data 132. Vulnerability Detection Model 114 may use one or more algorithms like linear regression, generalized additive models, artificial neural networks or random forests to generate an output symbolizing vulnerabilities in the input source code. The system may partition Training Data 132 into a training set and a cross-validating set. Using the training set, the system may train Vulnerability Detection Model 114 using, for example, the gradient descent technique. The system may then cross-validate the trained model using the cross-validating set and further fine-tune the parameters of the model. Vulnerability Detection Model 114 may include one or more parameters that it uses to translate input into outputs. For example, an artificial neural network contains a matrix of weights, each weight in which is a real number. The repeated multiplication and combination of weights transform input values to Vulnerability Detection Model 114 into output values. The system may measure the performance of Vulnerability Detection Model 114 using a method such as cross-validation to generate a quantitative representation, e.g., a first performance metric.

Vulnerability Detection Model 114 may, in some embodiments, output a set of vulnerable software libraries labeled with vulnerability estimates corresponding to each vulnerable software library. The vulnerability estimates indicate an expected severity or likelihood of harm arising from the vulnerable software library. In some embodiments using associated vulnerability estimates or degrees of severity the system may determine that a first subset of vulnerable software libraries exceed a threshold severity. The system may thus transmit a notification to a deployment system indicating that the first subset of vulnerable software libraries is ineligible for deployment. For example, the system may determine that a piece of source code is liable to cause a system crash if deployed due to one or more vulnerable libraries used. The system may therefore indicate to a development pipeline control system that the source code cannot be deployed for some period of time or until it is modified. In some embodiments, Vulnerability Detection Model 114 may output vulnerable software libraries in context due to specific applications that render the software libraries vulnerable. In other embodiments, Vulnerability Detection Model 114 may output general vulnerable software libraries which pose vulnerabilities by their nature.

At step 406, process 400 (e.g., using one or more components described above) may receive second source code being tested in a development environment. At step 408, process 400 (e.g., using one or more components described above) may collect, through the development environment, the second source code and second runtime data flow associated with the second source code. The system may deploy the trained Vulnerability Detection Model 114 to a development environment. The development environment may collect a piece of second source code and a corresponding second runtime data flow. The second source code may not be included in Training Data 132. Vulnerability Detection Model 114 may take the second source code and the second runtime data flow as input.

At step 410, process 400 (e.g., using one or more components described above) may process the second source code and second runtime data flow using the vulnerability detection model to identify a set of novel vulnerable software libraries and a set of known vulnerable software libraries in the second source code, wherein the set of novel vulnerable software libraries is not in first set of sample vulnerable libraries. Vulnerability Detection Model 114 may produce an output of vulnerable software libraries, including a set of novel vulnerable software libraries (e.g., Novel Vulnerable Software Library(ies) 116) and a set of known vulnerable software libraries (e.g., Known Vulnerable Software Library(ies) 118) in the second source code. The novel vulnerable software libraries may be absent from Training Data 132 and have never been exposed to Vulnerability Detection Model 114. For example, a new vulnerability may be created by the combination of a first function from a first library with a separate function in the input source code. Neither the first function nor the first library has previously been identified as vulnerable, but this particular combination creates a vulnerability. By processing the runtime data flow in addition to the source code, Vulnerability Detection Model 114 may be able to determine software libraries to be vulnerable de novo. Among the vulnerable software libraries detected by Vulnerability Detection Model 114 may be known vulnerable software libraries. These libraries may have been in Training Data 132. The contextual applications of their vulnerability may be represented in Training Data 132, or the known vulnerable software libraries may have been labeled as generally vulnerable. In some embodiments, the system may receive a first set of compliance requirements. Compliance requirements related to permissible software libraries for the input source code. The system may therefore adjust the set of known vulnerable software libraries to include software libraries that contradict the first set of compliance requirements. For example, a particular software library may be in violation of a data integrity requirement imposed by the software developer's organization. The system may therefore choose to output the software library as vulnerable.

At step 412, process 400 (e.g., using one or more components described above) may generate suggestions to replace the set of known vulnerable software libraries. The system may present Novel Vulnerable Software Library(ies) 116 through the development environment to a user responsible for generating the input source code. The system may request user input (e.g., as part of User Suggestion(s) 134) regarding the user's assessments of vulnerability or risk relating to Novel Vulnerable Software Library(ies) 116. For example, the system may ask the user to enter a numerical value for each vulnerable software library in Novel Vulnerable Software Library(ies) 116 indicating a likelihood or severity of harm resulting from the vulnerable library. The user may, for example, enter a real number or decline in order to indicate that the presented library is not in fact vulnerable. In some embodiments, the system may additionally request input from the user regarding common replacement libraries for the shown vulnerable library. The system may store the user's input in User Suggestion(s) 134. In some embodiments, User Suggestion(s) 134 may be formatted into training data, including source code, runtime data flow, and vulnerability estimates based on the user's input. The training data can then be used to update Vulnerability Detection Model 114.

The system may present a set of suggestions to a user through the development environment, each suggestion in which corresponds to a known vulnerable software library. The system may generate the set of suggestions using a set of safe libraries. The system may use a similarity machine learning model to determine a set of replacement libraries associated with the set of known vulnerable software libraries. The similarity machine learning model may be trained to identify software libraries that are commonly used as replacements for each other. The training data for the similarity machine learning model may include past user suggestions for source code processed by the Vulnerability Detection Model 114 and/or datasets of software library occurrence frequencies in source code. The similarity machine learning model may output one or more replacement software libraries corresponding to each known vulnerable software library.

At step 414, process 400 (e.g., using one or more components described above) may in response to detecting a user choosing a first replacement library in place of a first vulnerable library, record the first replacement library in association with the first vulnerable library. In some embodiments, the user may select replacement libraries for the set of novel vulnerable software libraries and/or the set of known vulnerable software libraries. The system may detect and record user selections regarding replacement libraries. For example, the user selections may be transmitted to a development process review system, where additional oversight may be applied to the user's choices to ensure optimal development standards. For example, the user selections may be used as additional training data that, when used to label the set of known vulnerable software libraries, may be used to train Vulnerability Detection Model 114.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a training dataset, comprising first source code, first runtime data flow, a first set of sample vulnerable libraries associated with the first source code, and a first set of sample replacement libraries associated with the first set of sample vulnerable libraries, wherein a vulnerable library includes code that when executed on a computer system poses a security risk for the computer system; using the training dataset, training a vulnerability detection model to detect vulnerable software libraries in the first source code; receiving second source code being tested in a development environment; collecting, through the development environment, the second source code and second runtime data flow associated with the second source code; processing the second source code and second runtime data flow using the vulnerability detection model to identify a set of novel vulnerable software libraries and a set of known vulnerable software libraries in the second source code, wherein the set of novel vulnerable software libraries is not in the first set of sample vulnerable libraries, and wherein the set of known vulnerable software libraries is in the first set of sample vulnerable libraries and used in training the vulnerability detection model; generating a first set of replacement libraries to replace the set of known vulnerable software libraries based on the first set of sample replacement libraries; generating confidence scores associated with the set of novel vulnerable software libraries, wherein the confidence scores are indicative of a likelihood of a software library being vulnerable; receiving user input in association with at least a portion of the set of novel vulnerable software libraries, the user input being indicative of a second set of replacement libraries for at least a portion of the set of novel vulnerable software libraries; and for each vulnerable library in the set of novel vulnerable software libraries and the set of known vulnerable software libraries, in response to detecting a replacement library in the first set of replacement libraries or the second set of replacement libraries, replacing the vulnerable library with an associated replacement library.
2. A method for detecting vulnerabilities in software in real time, comprising: receiving a training dataset, comprising first source code, first runtime data flow, and a first set of sample vulnerable libraries associated with the first source code; using the training dataset, training a vulnerability detection model to detect vulnerable software libraries in the first source code; receiving second source code being tested in a development environment; collecting, through the development environment, the second source code and second runtime data flow associated with the second source code; processing the second source code and second runtime data flow using the vulnerability detection model to identify a set of novel vulnerable software libraries and a set of known vulnerable software libraries in the second source code, wherein the set of novel vulnerable software libraries is not in the first set of sample vulnerable libraries, and wherein the set of known vulnerable software libraries is in the first set of sample vulnerable libraries and used in training the vulnerability detection model; generating a set of replacement libraries to replace the set of known vulnerable software libraries and the set of novel vulnerable software libraries; and for each vulnerable library in the set of novel vulnerable software libraries and the set of known vulnerable software libraries, in response to detecting a replacement library in the set of replacement libraries, replacing the vulnerable library with an associated replacement library.
3. The method of any one of the preceding embodiments, further comprising: receiving a first registry of known vulnerabilities associated with the first source code and the first runtime data flow; and using the first registry of known vulnerabilities, updating the vulnerability detection model.
4. The method of any one of the preceding embodiments, wherein identifying the set of novel vulnerable software libraries further comprises: receiving a first output vector from the vulnerability detection model, comprising a first set of vulnerable software libraries, wherein each vulnerable software library is associated with a degree of severity and a category of vulnerability.
5. The method of any one of the preceding embodiments, further comprising: using associated categories of vulnerability, displaying the first set of vulnerable software libraries in the development environment.
6. The method of any one of the preceding embodiments, further comprising: ranking the first set of vulnerable software libraries using associated degrees of severity; and displaying the first set of vulnerable software libraries in the development environment using the ranked first set of vulnerable software libraries.
7. The method of any one of the preceding embodiments, further comprising: retrieving a first set of outcomes associated with the first source code and the first runtime data flow; using the first set of outcomes and the training dataset, generating a labeled training dataset; and using the labeled training dataset, updating the vulnerability detection model.
8. The method of any one of the preceding embodiments, further comprising: receiving a first set of vulnerability estimates associated with one or more vulnerable software libraries; using the first set of vulnerability estimates and the training dataset, generating a labeled training dataset; and using the labeled training dataset, updating the vulnerability detection model.
9. The method of any one of the preceding embodiments, wherein generating suggestions to replace the set of known vulnerable software libraries comprises: retrieving a set of safe libraries; using a library similarity machine learning model, determining a set of replacement libraries associated with the set of known vulnerable software libraries, wherein each vulnerable software library in the set of known vulnerable software libraries is associated with one or more replacement libraries; and generating suggestions to replace each vulnerable library in the set of known vulnerable software libraries with associated replacement libraries.
10. The method of any one of the preceding embodiments, further comprising: processing the second source code and second runtime data flow using the vulnerability detection model to identify a set of vulnerable software functions in the second source code; and generating suggestions to replace the set of vulnerable software functions.

11. The method of any one of the preceding embodiments, further comprising: receiving a first set of compliance requirements, wherein each requirement in the first set of compliance requirements relates to permissible software libraries for the second source code; and using the first set of compliance requirements, generating an expanded set of vulnerable software libraries, wherein the expanded set of vulnerable software libraries comprises the set of novel vulnerable software libraries, the set of known vulnerable software libraries and software libraries that contradict the first set of compliance requirements.

12. The method of any one of the preceding embodiments, further comprising: using associated degrees of severity, determine that a first subset of vulnerable software libraries exceed a threshold severity; and transmitting a notification to a deployment system indicating that the first subset of vulnerable software libraries is ineligible for deployment.

13. A method comprising: receiving a vulnerability detection model trained to detect vulnerable software libraries in source code; receiving first source code being tested in a development environment; collecting, through the development environment, the first source code and first runtime data flow associated with the first source code; processing the first source code and first runtime data flow using the vulnerability detection model to identify a set of novel vulnerable software libraries and a set of known vulnerable software libraries in the first source code, wherein the set of novel vulnerable software libraries is not in used in training the vulnerability detection model, and wherein the set of known vulnerable software libraries is used in training the vulnerability detection model; generating a first set of replacement libraries to replace the set of known vulnerable software libraries; generating confidence scores associated with the set of novel vulnerable software libraries, wherein the confidence scores are indicative of a likelihood of a software library being vulnerable; generating a second set of replacement libraries to replace the set of known vulnerable software libraries and the set of novel vulnerable software libraries; and for each vulnerable library in the set of novel vulnerable software libraries and the set of known vulnerable software libraries, in response to detecting a replacement library in the first set of replacement libraries or the second set of replacement libraries, replacing the vulnerable library with an associated replacement library.

14. One or more tangible, non-transitory, computer-readable media storing instructions that, when executed by a data processing apparatus, cause the data processing apparatus to perform operations comprising those of any of embodiments 1-13.

15. A system comprising one or more processors; and memory storing instructions that, when executed by the one or more processors, cause the one or more processors to effectuate operations comprising those of any of embodiments 1-13.

16. A system comprising means for performing any of embodiments 1-13.

What is claimed is:

1. A system for detecting vulnerabilities in software in real time, comprising:

one or more processors; and one or more non-transitory, computer-readable media comprising instructions that, when executed by the one or more processors, cause operations comprising:

receiving a training dataset comprising first source code, first runtime data flow associated with transformation and passage of data during an execution of the first source code, a first set of sample vulnerable libraries associated with the first source code, and a first set of sample replacement libraries associated with the first set of sample vulnerable libraries, wherein the first runtime data flow comprises program states, traces, and control flow data, and wherein a vulnerable library, of the first set of sample vulnerable libraries, includes code that when executed on a computer system poses a security risk for the computer system;

collecting, through a development environment, the (1) second source code being tested in the development environment and (2) second runtime data flow associated with transformation and passage of data, wherein the second runtime data flow comprises second program states and second control flow data during an execution of the second source code;

processing the second source code and the second runtime data flow using a vulnerability detection model, trained using the training dataset, to identify a set of novel vulnerable software libraries and a set of known vulnerable software libraries in the second source code, wherein the set of novel vulnerable software libraries is not in the first set of sample vulnerable libraries, and wherein the set of known vulnerable software libraries is in the first set of sample vulnerable libraries;

generating one or more confidence scores that indicate a likelihood of whether at least a novel vulnerable software library, of the set of novel vulnerable software libraries, is vulnerable;

generating a first set of replacement libraries to replace the set of known vulnerable software libraries based on the first set of sample replacement libraries;

receiving user input in association with at least a portion of the set of novel vulnerable software libraries, the user input being indicative of a second set of replacement libraries for at least a portion of the set of novel vulnerable software libraries; and for each vulnerable library in the set of novel vulnerable software libraries and the set of known vulnerable software libraries, in response to detecting a replacement library in the first set of replacement libraries or the second set of replacement libraries, replacing the vulnerable library with an associated replacement library.

2. A method for detecting vulnerabilities in software in real time, comprising:

receiving a training dataset, comprising first source code, first runtime data flow associated with transformation and passage of data during an execution of the first source code, a first set of sample vulnerable libraries associated with the first source code, and a first set of sample replacement libraries associated with the first set of sample vulnerable libraries, wherein the first runtime data flow comprises program states, traces, and control flow data, and wherein a vulnerable library, of the first set of sample vulnerable libraries, includes code that when executed on a computer system poses a security risk for the computer system;

collecting, through a development environment, (1) second source code being tested in the development environment and (2) second runtime data flow associated with transformation and passage of data, wherein the second runtime comprises second program states and second control flow data during an execution of the second source code;

processing the second source code and the second runtime data flow using a vulnerability detection model, trained using the training dataset, to identify a set of novel vulnerable software libraries and a set of known vulnerable software libraries in the second source code, wherein the set of novel vulnerable software libraries is not in the first set of sample vulnerable libraries, and wherein the set of known vulnerable software libraries is in the first set of sample vulnerable libraries;

generating one or more confidence scores that indicate a likelihood of whether at least a novel vulnerable software library, of the set of novel vulnerable software libraries, is vulnerable;

generating a first set of replacement libraries to replace the set of known vulnerable software libraries based on the first set of sample replacement libraries;

receiving user input in association with at least a portion of the set of novel vulnerable software libraries, the user input being indicative of a second set of replacement libraries for at least a portion of the set of novel vulnerable software libraries; and for each vulnerable library in the set of novel vulnerable software libraries and the set of known vulnerable software libraries, in response to detecting a replacement library in the first set of replacement libraries or the second set of replacement libraries, replacing the vulnerable library with an associated replacement library.

3. The method of claim 2, further comprising:

receiving a first registry of known vulnerabilities associated with the first source code and the first runtime data flow; and using the first registry of known vulnerabilities, updating the vulnerability detection model.

4. The method of claim 2, wherein identifying the set of novel vulnerable software libraries further comprises:

receiving a first output vector from the vulnerability detection model, comprising a first set of vulnerable software libraries, wherein each vulnerable software library is associated with a degree of severity and a category of vulnerability.

5. The method of claim 4, further comprising:

using associated categories of vulnerability, displaying the first set of vulnerable software libraries in the development environment.

6. The method of claim 4, further comprising:

ranking the first set of vulnerable software libraries using associated degrees of severity; and displaying the first set of vulnerable software libraries in the development environment using the ranked first set of vulnerable software libraries.

7. The method of claim 2, further comprising:

retrieving a first set of outcomes associated with the first source code and the first runtime data flow;

using the first set of outcomes and the training dataset, generating a labeled training dataset; and using the labeled training dataset, updating the vulnerability detection model.

8. The method of claim 2, further comprising:

receiving a first set of vulnerability estimates associated with one or more vulnerable software libraries;

using the first set of vulnerability estimates and the training dataset, generating a labeled training dataset; and using the labeled training dataset, updating the vulnerability detection model.

9. The method of claim 2, wherein generating the first set of replacement libraries to replace the set of known vulnerable software libraries comprises:

retrieving a set of safe libraries;

using a library similarity machine learning model, determining a set of replacement libraries associated with the set of known vulnerable software libraries, wherein each vulnerable software library in the set of known vulnerable software libraries is associated with one or more replacement libraries; and generating the first set of replacement libraries to replace each vulnerable library in the set of known vulnerable software libraries with associated replacement libraries.

10. The method of claim 2, further comprising:

processing the second source code and the second runtime data flow using the vulnerability detection model to identify a set of vulnerable software functions in the second source code; and generating suggestions to replace the set of vulnerable software functions.

11. The method of claim 2, further comprising:

receiving a first set of compliance requirements, wherein each requirement in the first set of compliance requirements relates to permissible software libraries for the second source code; and using the first set of compliance requirements, generating an expanded set of vulnerable software libraries, wherein the expanded set of vulnerable software libraries comprises the set of novel vulnerable software libraries, the set of known vulnerable software libraries and software libraries that contradict the first set of compliance requirements.

12. The method of claim 4, further comprising:

using associated degrees of severity, determine that a first subset of vulnerable software libraries exceed a threshold severity; and transmitting a notification to a deployment system indicating that the first subset of vulnerable software libraries is ineligible for deployment.

13. One or more non-transitory, computer-readable media comprising instructions that, when executed by one or more processors, cause operations comprising:

receiving a vulnerability detection model trained using a training dataset comprising first source code, first runtime data flow associated with transformation and passage of data during an execution of the first source code, a first set of sample vulnerable libraries associated with the first source code, and a second set of sample replacement libraries associated with the first set of sample vulnerable libraries, wherein the first runtime data flow comprises program states, traces, and control flow data, and wherein a vulnerable library, of the first set of sample vulnerable libraries, includes code that when executed on a computer system poses a security risk for the computer system;

collecting, through a development environment, (1) second source code being tested in the development environment and (2) second runtime data flow associated with transformation and passage of data, wherein the second runtime data flow comprises second program states and second control flow data during an execution of the second source code;

processing the first second source code and the second runtime data flow using the vulnerability detection model to identify a set of novel vulnerable software libraries and a set of known vulnerable software libraries in the second source code, wherein the set of novel vulnerable software libraries is not in the first set of sample vulnerable libraries, and wherein the set of known vulnerable software libraries in the first set of sample vulnerable libraries;

generating one or more confidence scores that indicate a likelihood of whether at least a novel vulnerable software library, of the set of novel vulnerable software libraries, is vulnerable;

generating a first set of replacement libraries to replace the set of known vulnerable software libraries based on the second set of sample replacement libraries;

receiving user input in association with at least a portion of the set of novel vulnerable software libraries, the user input being indicative of a second set of replacement libraries for at least a portion of the set of novel vulnerable software libraries; and for each vulnerable library in the set of novel vulnerable software libraries and the set of known vulnerable software libraries, in response to detecting a replacement library in the first set of replacement libraries or the second set of replacement libraries, replacing the vulnerable library with an associated replacement library.

14. The one or more non-transitory, computer-readable media of claim 13, wherein identify a set of vulnerable software libraries further comprises:

receiving a first output vector from the vulnerability detection model, comprising a first set of vulnerable software libraries, wherein each vulnerable software library is associated with a degree of severity and a category of vulnerability.

15. The one or more non-transitory, computer-readable media of claim 14, further comprising:

using associated categories of vulnerability, displaying the first set of vulnerable software libraries in the development environment.

16. The one or more non-transitory, computer-readable media of claim 14, further comprising:

ranking the first set of vulnerable software libraries using associated degrees of severity; and displaying the first set of vulnerable software libraries in the development environment using the ranked first set of vulnerable software libraries.

17. The one or more non-transitory, computer-readable media of claim 13, further comprising:

retrieving a first set of outcomes associated with the set of novel vulnerable software libraries;

using the first set of outcomes and the one or more confidence scores, generating a labeled training dataset; and using the labeled training dataset, updating the vulnerability detection model.

18. The one or more non-transitory, computer- readable media of claim 13, further comprising:

receiving a first set of vulnerability estimates associated with one or more vulnerable software libraries;

using the first set of vulnerability estimates and one or more the confidence scores, generating a labeled training dataset; and using the labeled training dataset, updating the vulnerability detection model.

19. The one or more non-transitory, computer-readable media of claim 13, wherein generating the first set of replacement libraries to replace the set of known vulnerable software libraries comprises:

retrieving a set of safe libraries;

using a library similarity machine learning model, determine a set of replacement libraries associated with the set of known vulnerable software libraries, wherein each vulnerable software library in the set of known vulnerable software libraries is associated with one or more replacement libraries; and generating the first set of replacement libraries to replace each vulnerable library in the set of known vulnerable software libraries with associated replacement libraries.

20. The one or more non-transitory, computer-readable media of claim 13, further comprising:

processing the first source code and the first runtime data flow using the vulnerability detection model to identify a set of vulnerable software functions in the first source code; and generating suggestions to replace the set of vulnerable software functions.

* * * * *